(12) United States Patent
Mascia et al.

(10) Patent No.: US 6,309,499 B1
(45) Date of Patent: Oct. 30, 2001

(54) PROCESS AND A APARATUS FOR PRODUCTION OF MULTILAYER TRIM ELEMENTS FOR VEHICLES

(75) Inventors: Francesco Mascia; Cristiano Puppi, both of Guanzate (IT)

(73) Assignee: Johnson Control S.p.A., Lomagna (IT)

( * ) Notice: Subject to any disclaimer, the term of this patent is extended or adjusted under 35 U.S.C. 154(b) by 0 days.

(21) Appl. No.: 09/367,485

(22) PCT Filed: Dec. 23, 1998

(86) PCT No.: PCT/EP98/08433
§ 371 Date: Aug. 16, 1999
§ 102(e) Date: Aug. 16, 1999

(87) PCT Pub. No.: WO99/33637
PCT Pub. Date: Jul. 8, 1999

(30) Foreign Application Priority Data
Dec. 29, 1997 (EP) ................................................. 97830728

(51) Int. Cl.[7] .................................................. B32B 31/30
(52) U.S. Cl. .............................. 156/244.12; 156/244.11; 156/244.27; 156/349; 156/459; 156/580.1; 428/36.1; 442/327; 442/381

(58) Field of Search ............................... 428/36.1, 292.1, 428/293.1, 295.1, 297.1, 330.7; 492/327, 381; 156/244.11, 244.24, 244.27, 309.9, 324, 176, 349, 459, 580.1; 264/176.1, 177.2, 211.2, 211.18

(56) References Cited

FOREIGN PATENT DOCUMENTS

| 42 14 389 | 4/1993 | (DE) . |
| 44 23 883 | 1/1994 | (DE) . |
| 668142 | 8/1995 | (EP) . |
| 0 747 213 | 12/1996 | (EP) . |
| 2 067 135 | 7/1981 | (GB) . |
| WO 98 05489 | 2/1998 | (WO) . |

OTHER PUBLICATIONS

Principles of Polymer Processing, John Wiley & Sons, 1979, pp. 3–6.

*Primary Examiner*—Rich Weisberger
(74) *Attorney, Agent, or Firm*—Cobrin & Gittes

(57) ABSTRACT

Panels and elements for vehicle interiors are obtained by co-extrusion or co-lamination of a layer (10*a*) of themoplastic support material containing a reinforcement filler with a layer (9*a*) of thermoplastic covering material containing an amorphous thermoplastic and by thermoforming the resulting sheets in a press.

13 Claims, 1 Drawing Sheet

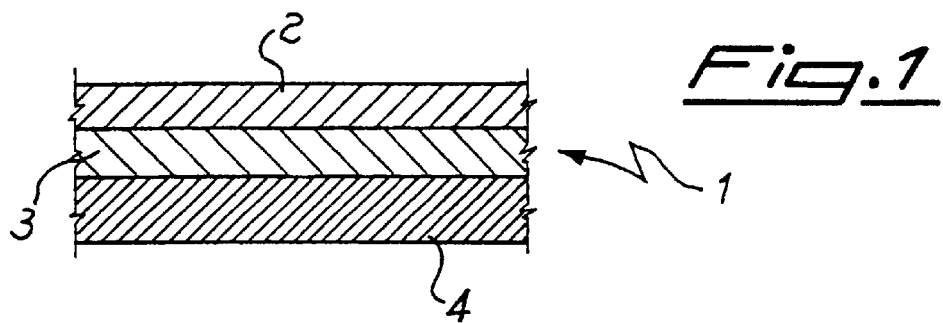
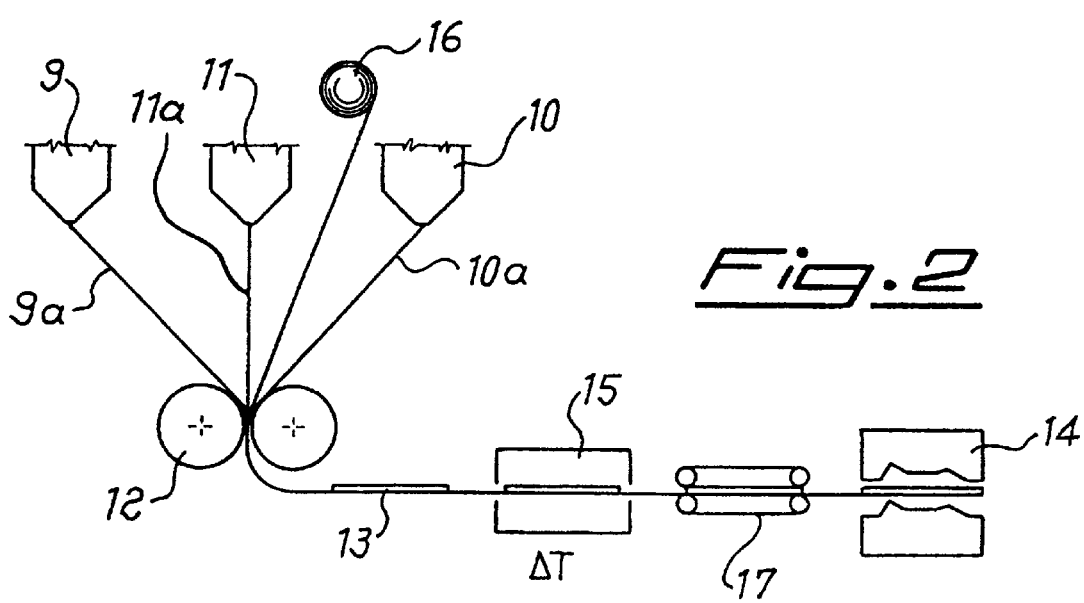
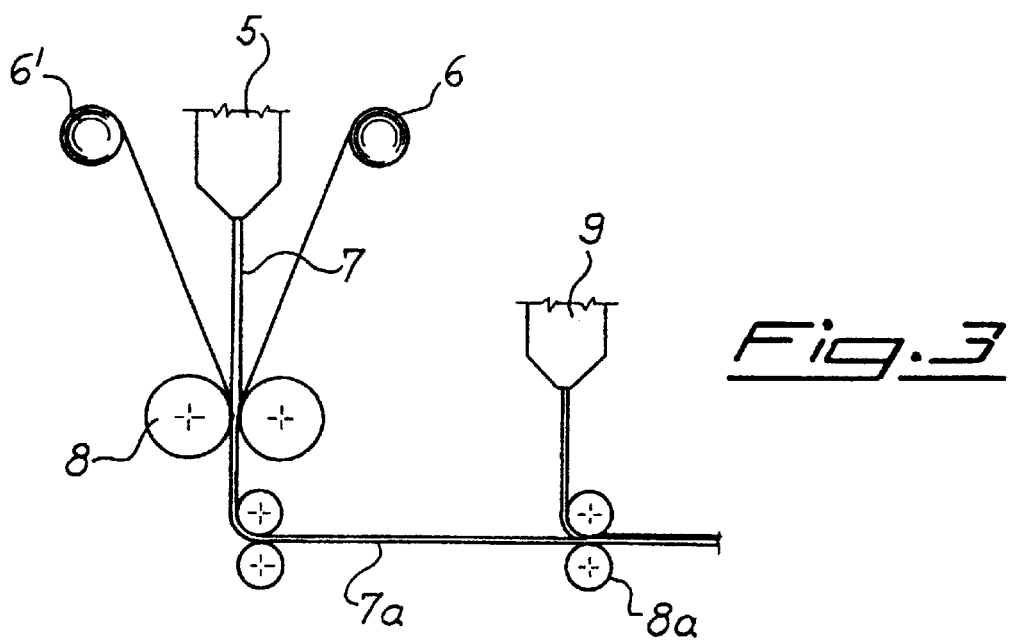

PROCESS AND A APARATUS FOR PRODUCTION OF MULTILAYER TRIM ELEMENTS FOR VEHICLES

FIELD OF THE INVENTION

The present invention relates to a method and a plant for the production of multi-layer auto vehicles trim panels in thermoplastic material. More particularly, the present invention relates to a method for the production of vehicle interior elements such as, for instance, panels, hatboxes, dashboards, consoles and the like, by thermoforming multi-layer sheets. The vehicle interior elements thus obtained are also an object of the present invention.

BACKGROUND OF THE INVENTION

Thermoformed autovehicles interiors are generally obtained from sheets comprising a support material and an external covering layer for aesthetic purposes. According to a widely known and used technique, the external covering (known as "imitation leather") is produced separately and thereafter joined to the support previously heated in a press. The press also provides for the shaping of the panel into the required form.

The support material is generally a polyolefin resin with a vegetable filler comprising for the most part wood powder. The imitation leather is generally in PVC and comprises a layer of cotton fabric or other textile material which acts as a mechanical bonding means for the polyolefin support.

This technique has several of drawbacks. In the first place, the cost and weight of the traditional imitation leather in PVC are both quite high. A second problem arises from the costs of the process, which requires many steps—some of which are particularly long—such as the cutting of the imitation leather and its positioning on the support plate. Further problems derive from the anisotropy of the panel as produced, from the fact that to recycle the waste or the panel at the end of its life it is necessary to remove the imitation leather (PVC) from the support layer (PP), and problems arise from the mechanical and hand (touch) characteristics of the product.

It has been proposed to produce the panels and the vehicle interior elements by co-injecting the support material and the external imitation leather material. This solution resolves many of the preceding problems but is suited to some types of panel only. The European Patent Application no. 0668142 discloses a method according to which sheets formed from a support layer and two external covering layers are co-extruded; these sheets are then thermoformed to give trim panels for cars, packing containers and the like. The support comprises polyolefin and an organic filler, particularly cellulose fibers, and the covering layers comprise polyolefin and inorganic fillers such as talc and carbonate. Panels of this type apparently present acceptable mechanical characteristics, but aesthetic and hand characteristics are completely insufficient.

DISCLOSURE OF THE INVENTION

An object of the present invention is to solve the above cited problems by means of a method for producing autovehicles trim panels by thermoforming that is simple, inexpensive and reliable, and that give panels with good mechanical properties and excellent aesthetic and hand properties.

A further object of the invention is to obtain thermoformable multi-layer sheets and finished elements having the above characteristics.

Such objects are achieved through the present invention, which relates to a method for the production of autovehicles interiors and similar products shaped by thermoforming, characterized according to claim 1.

According to a preferred embodiment of the invention, support and covering layers are co-extruded.

According to another aspect of the invention the support layer is obtained by impregnation of two long-fiber needle-punched layers (natural and/or non-woven fabric) with an extruded polyolefin layer; preferably the covering layer is co-laminated on this support. The invention also relates to a plant to carry out the method, the plant being characterized according to claim 8.

The method according to the invention presents several advantages compared to known methods in the art. The number of steps and the working time are greatly reduced, as it is no longer necessary to produce the imitation leather layer and the support sheets separately and then to join them in a press by thermoforming. Materials with identical or similar bases can be used, for instance PP or polyolefin in general, for both the imitation leather and the support; in this way it is possible to recycle offcuts and production waste. It is no longer necessary to cut the imitation leather and line it up above the support sheet. The embossing of the imitation leather can take place directly in the thermoforming mould, which eliminates the problems of loss of embossing during the thermoforming step and of producing different embossings in different parts of the panel. Besides, the cost of the material is lower; the cost of a imitation leather in PVC is more than double that of an imitation leather produced according to the invention. Finally, the resulting panel is more isotropic.

BRIEF DESCRIPTION OF THE DRAWINGS

The invention will now be disclosed in greater detail with reference to the enclosed non-limiting drawings, in which:

FIG. 1 is a schematic sectional view of a thermoformable sheet obtained according to the invention;

FIG. 2 is a plant layout for co-extrusion of the sheets according to the invention; and FIG. 3 is a plant layout for the co-lamination of a sheet according to the invention.

MODES OF CARRYING OUT THE INVENTION

As mentioned above, the method according to the invention provides for the preparation of a layer of thermoplastic support material comprising a filler, the preparation of a covering (skin) material comprising an amorphous thermoplastic material, the binding of the said support material with said covering to form a substantially flat multi-layer sheet, and the shaping of said sheet by thermoforming.

As is well known, an amorphous thermoplastic material is a material that has no, or substantially no, crystalline content. Examples of amorphous materials are PVC, ABS, EVA, TPU and EP(D)M, SBR, SEBS rubbers. Polypropylene (co)polymers can be partially amorphous. The quantity of amorphous thermoplastic material is between 30% and 100% by weight of the covering material and preferably is at least 60% (w/w).

Preferably, the support and covering materials are chemically compatible: for instance, a PP based support material with wood powder filler is used with a polypropylene thermoplastic elastomer imitation leather. As an alternative, a means of chemical or mechanical compatibilization, such as for instance stockingette (cotton fabric), can be used. The chemical compatibilization can be obtained by adding compatibilizing agents such as for instance maleic and fumaric acids, maleic anhydride, metoxysilane, acrylic acids or similar compounds to the support or the covering materials during the extrusion of same. A further way of making incompatible materials compatible is to laminate them with a film of compatible material: an example is a laminate comprising a central layer of expanded polyurethane and two external films of PE, PP or EVA. A layer of this type is unrolled from a spool and placed between the material obtained from the two extrusion heads for the support and the covering to improve the hand of the final product.

FIG. 1 shows a section of a sheet 1 of the type described above, comprising a covering 2, a support 4 and a central foamed layer 3.

In an embodiment of the invention the foamed layer is obtained by extruding it and expanding it with a chemical or physical expander. FIG. 2 shows a co-extrusion plant layout comprising two flat-head co-extruders 9 and 10, to extrude the covering material 9a and the support material 10a respectively. There is also a third extruder 11 to extrude the central layer 3—for instance an expanded layer—between the two layers 9 and 10.

The material for the support is a thermoplastic material containing from 10% to 80% by weight of a filler that is preferably an organic cellulose filler, for instance wood powder. If the filler is wood powder, the material of the support is obtained preferably by reactive extrusion. This reactive extrusion is obtained by treating a polyolefin, the wood powder, maleic anhydride and radical initiators in the extruder and was disclosed e.g. in European Patent Application no. 96830432.9 in the name of the applicant. A preferred formulation provides for the use of: homo- and co-polymers of propylene, particularly those with isotactic index higher than 30%; between 20% and 60% by weight of a fibrous reinforcement filler, preferably vegetable like wood powder; from 0.05% to 0.5% of peroxide radical initiators, for instance: dicumilperoxide, and 0,2–2,0% of compatibilizator agent of the type mentioned above.

FIG. 3 shows schematically the production of another type of support. In this case the support is obtained by passing a layer of polyolefin (preferably PP) and two layers of long-fiber "mats", through a calender 8. The polyolefin is extruded and, while the extruded sheet is still in a partially molten state, it is immediately calendered with the two mats, so that the polyolefin is impregnated and compacted with the mats. Long-fiber mat is here understood to designate those fibrous supports that are obtained by needle-punching or equivalent method using fibers longer than 3 mm and preferably longer than 1 cm. The fibers could be vegetable (jute, flax) or synthetic, particularly non-woven fabric which in same case is not further needle-punched, for instance when it is hydrobonded.

Preferred fibrous supports are those with long vegetable or mixed vegetable-synthetic fiber, and with weight within the range of 200 to 500 g/m$^2$.

The material for the covering is a thermoplastic material containing an amorphous polymer material; the quantity of amorphous material is between 30% and 100% by weight of the covering material. Preferably, the cover layer is a polyolefin thermoplastic elastomer.

Thermoplastic materials useful for producing the covering are selected from among homo- and co-polymers of alpha olefins such as ethylene, propylene, ethylene-propylene, copolymers of propylene containing one or more alpha olefin with 2–10 atoms of carbon (for instance ethylene, 1-butene, 1-pentene, 4-methyl-1-pentene, 1-hexene, 1-ottene); EPM rubbers (ethylene/propilene) and EPDM rubbers (ethylene/propylene/diene); natural rubber; EVA (ethylene/vinylacetate); ethylene/1-ottene co-polymer; polyenic home- and co-polimers like the polybutadiene; styrol/ butadiene rubbers (SBR), hydrogenated styrol/butadiene co-polymers (SEBS); acrilo-nitrile/butadiene/styrene co-polymers, their functionalized polymers and their mixtures.

The quantity of EP(D)M rubbers, or their analogues, used is generally between 6% and 30% by weight of the total weight of the formulation of covering. The rubbers can also be extended with oils (parafin and naphtene types) to increase the softness to the touch; the quantity of oil added is between 20% and 60% by weight of the rubber.

The starting thermoplastic material should contain cross-linked and non-cross-linked compounds and is preferably obtained by reactive extrusion, i.e. a heat treatment of mixing in the presence of radical initiators (preferably peroxides) and compatibilizing agents. Further examples of suitable thermoplastic elastomers for the present invention are described in Application PCT/EP96/00136 (WO 96/22327) in the name of the applicant. Preferably the covering material will be obtained from a mixture of polypropylene, polyalkenylenes (5–15% in weight), EP(D)M rubbers (8–40% in weight) and vinylpolybutadienes (0.5–4.0% in weight).

The method for co-extrusion provides (FIG. 2) for the extrusion of the support material 10a, the external covering material 9a and any inside material 11a through the corresponding extruders 10, 9 and 11. Other extruders are possible to give further additional layers, or layers of ready material (for instance expanded material) may be unwound from a spool 16. The layers of extruded material in a plastic, i.e. partially molten state, are then fed through calender 12 that binds them together and imparts the final thickness of the flat sheet 13 that is drawn from it.

If necessary, the sheet 13 is then heated in continuous oven 15 and calibrated in continuous press 17; finally, the sheet is thermoformed in continuous press 14 to give the final product.

In the case of a co-lamination (FIG. 3), first the layer of support material 7 is extruded, and bonded to mats 6 and 6', then downstream of first calender 8, a layer 9b of covering material is applied to layer 7 and, where necessary, a third layer or a material from a spool similar to that described above is used. The multi-layer is calendered through second calender 8a and thereafter calibrated and thermoformed in a way similar to that cited above.

The panels thus obtained present a skin layer (made of the covering material) that covers all the visible surface of oneside of the same, i.e. the surface that will be the external surface of the panel once mounted on a vehicle. In the case of a two-layer panel produced with compatible materials, the imitation leather sticks directly to the support layer, in the absence of any physical means of bonding or mutual fixing, such as, e.g. a cotton fabric.

What is claimed is:

1. A method for the production of autovehicle trim panels and similar products shaped by thermoforming, characterized in that it comprises the following steps:

providing a layer of support material comprising thermoplastic material containing from 10% to 80% of a filler selected from vegetable fibers, wood powder and fiber mats;

providing a layer of covering material comprising a thermoplastic material comprising 30% to 50% of an amorphous thermoplastic material selected from a group consisting of amorphous polypropylene, polyvinyl chloride, ABS, EVA, TPU, SBR, EP(D)M, SEBS, rubbers and mixtures thereof;

bonding said layer of support material to said covering material to form a substantially flat multi-layer sheet; and shaping said sheet by thermoforming.

2. A method according to claim 1, wherein said sheet is obtained by co-extrusion of said support material (4,10*a*) and said covering material (2) in a partially molten state.

3. A method according to claim 1, wherein said covering material (9*a*) is co-laminated on said layer of support material (10*a*).

4. A method according to claim 1, wherein one or more additional layers (3, 11*a*, 16) are arranged and bonded between said covering and said support materials to provide said multilayer sheet.

5. A method according to claim 1, characterized by co-extruding a polyolefin support layer comprising a vegetable fiber filler and a covering layer of a polyolefin based thermoplastic elastomer.

6. A method according to claims 1, wherein said support material is produced by impregnating and calendering at least one long-fiber mat (6,6') with an extruded layer of thermoplastic material (7).

7. A method according to claim 1, wherein said support material and/or said covering material are obtained by reactive extrusion.

8. An apparatus for the production of autovehicle trim panels, comprising an extruder (5, 10) configured to extrude support material (7, 10*a*), an extruder (9) configured to extrude covering material, at least one calendar (8, 12) arranged and configured to bond together said extruded materials and a press (14) configured to thermoform multi-layer sheets of the extruded materials that were bound together by said calendar (5) said at least one calendar (8, 12) being arranged downstream of both of said extruders (5, 10, 9) to receive the extruded material from both of said extruders, said press being arranged downstream of said at least one calendar (8, 12) to receive the bound together extruded materials from said at least one calendar.

9. An apparatus according to claim 8, characterized in that the calender (8) is configured for impregnation of long-fibers mat with a polyolefin.

10. A multi-layer element as obtainable with the method according to claim 1.

11. A mulit-layer element according to claim 10, wherein said amorphous material is within the range of 60%–100% (w/w) of said covering layer.

12. A trim for vehicles as obtainable with the method according to claim 1.

13. A method according to claim 1, characterized by extruding the amorphous thermoplastic material and joining at least one long-fiber mat with the amorphous thermoplastic material, said layer of support material including said at least one long-fiber mat.

* * * * *